May 20, 1952   E. A. SCHUMACHER ET AL   2,597,119
ELECTRODE FOR AIR DEPOLARIZED PRIMARY GALVANIC CELLS
Filed Sept. 1, 1949
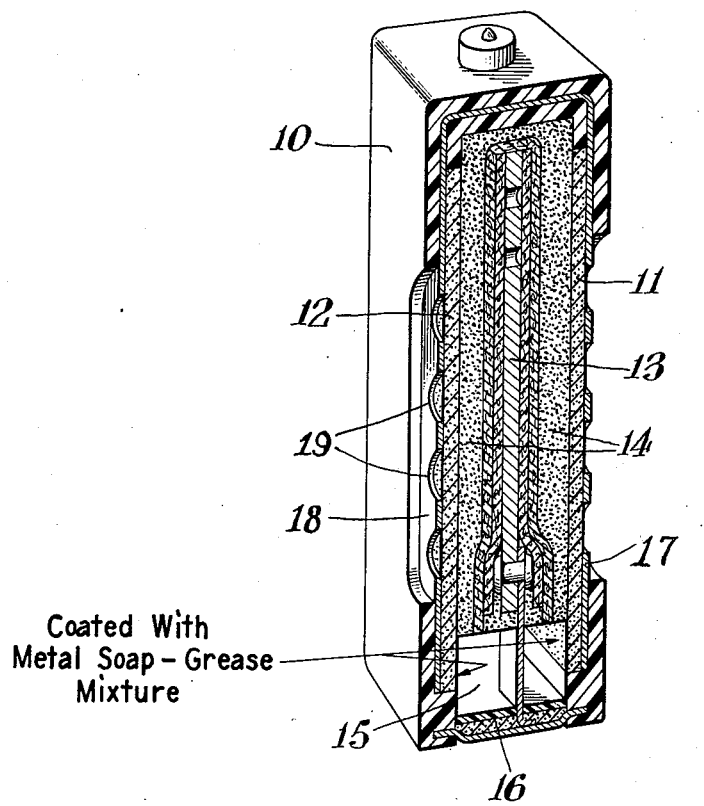
Coated With Metal Soap-Grease Mixture
INVENTORS
ERWIN A. SCHUMACHER
ROSWELL J. BENNETT
BY *D.C.Harrison*
ATTORNEY Patented May 20, 1952

2,597,119

UNITED STATES PATENT OFFICE 2,597,119

ELECTRODE FOR AIR DEPOLARIZED PRIMARY GALVANIC CELLS

Erwin A. Schumacher, Parma, and Roswell J. Bennett, Lakewood, Ohio, assignors, by mesne assignments, to Union Carbide and Carbon Corporation, a corporation of New York Application September 1, 1949, Serial No. 113,502

5 Claims. (Cl. 136—121)

This invention relates to primary galvanic cells of the air-depolarized type and refers more particularly to improved carbon electrodes for such cells and provision for venting gas therefrom.

In the conventional round type dry cell, internally generated gas may be vented through an inert carbon collector rod located in the depolarizing mix. It has also been the practice in flat cell construction to use carbon rod inserts in the mix to provide escape channels for any gas that might be formed as the result of chemical or cell action. However, venting through the carbon rod in both round and flat cells is not the sole means of releasing gas.

A different problem presents itself in the case of the air-depolarized cells of the type described and claimed in United States patent application Serial No. 52,018, filed September 30, 1948, by P. A. Marsal and R. P. Fox and assigned to the assignee of this application in which an air space, provided for the reception of liquid, is completely enclosed, and only the breathing or active carbon electrode is available for release of entrapped gas. In this type of cell, a portion of the active carbon communicates with the free space to provide a path for the escape of gas. However, due to paste syneresis, when the cell is subjected to use, and to the wetting action of the liberated alkaline solution, a film of liquid forms on this portion of the carbon electrode, blocking the gas escape passages. When the internal pressure in the cell increases for any reason, such as the internal generation of gas or the absorption of water vapor from the atmosphere, this liquid is forced into the porous carbon electrode at all areas of contact with the electrolyte, lessening its depolarizing effectiveness, and may even be forced completely through the electrode to escape from the breathing apertures, creating a serious hazard to the user of the cell.

To increase the "waterproofing" ordinarily employed to make the air-depolarized carbon electrode resistant to wetting by electrolyte, is not a solution to this problem, because the concentrations of waterproofing agents required for substantially complete repellency destroy the oxygen-sorptive capacity of the electro-chemically active portions of the carbon. Preferential treatment of the venting areas with additional waterproofing material e. g., mineral oil or rubber-oil mixtures, does retard the wetting action but only for a relatively short period, and, furthermore the large amounts of these materials required for adequate protection impair the gas permeability of the carbon electrode, so that even if wetting is delayed, substantial internal pressures may develop.

It is the principal object of this invention to provide a carbon electrode for use in air-depolarized primary galvanic cells, which electrode is permeable to gas internally generated or compressed in such cells but is not wet by electrolyte and which retains its capacity for depolarization by air.

The invention by means of which this object is achieved will be described with reference to the accompanying drawing, the single figure of which illustrates in vertical section an air-depolarized primary galvanic cell in which is incorporated a carbon electrode embodying the invention.

It has been discovered that particularly good resistance to surface wetting of an air-permeable carbon electrode by aqueous alkaline electrolyte is obtained by coating the carbon with a mixture of a metal soap and alkali-resistant oil or grease. The invention, which is based upon this discovery, is a carbon electrode, containing conventional waterproofing materials, for an air-depolarized primary galvanic cell, a portion of which electrode is coated with a metal soap and an alkali-resistant grease. As used herein and in the appended claims, the terms "grease," "mineral grease," and "alkali-resistant grease" are intended to include grease compositions, such as mineral oils and greases, which are free from soaps or soap-forming compounds.

Referring to the drawing, in an air-depolarized primary galvanic cell 10 there are provided two carbon electrodes 11, 12 and a zinc electrode 13 separated by an immobilized aqueous alkaline electrolyte 14. A free space 15 is provided in the bottom of the cell 10 and the lower portions of the electrodes 11, 12 extend into this free space. It is these portions of the electrodes 11, 12 which are coated with a metal soap-grease mixture in accordance with the invention. The cell is sealed internally by a gas-tight wax seal 16 below the free space 15. The electrodes 11, 12 are bonded to and supported by a pair of connected grids 17, 18 bonded to the container of the cell 10 and provided with apertures 19 through which air may be admitted to the "breathing" portions of the electrodes 11, 12, that is the portions of the electrodes in contact with the electrolyte 14.

Suitable metal soaps for the purposes of this invention include the stearates of barium, aluminum, magnesium, zinc and manganese or their combination with other fatty acids as, for example, palmitic acid. Especially good results have been obtained with barium stearate blended with mineral oils or greases. As little as one part of barium stearate may be used with as much as 60 parts of alkali-resistant grease or oil; very good results are secured with about 5 to 33 parts of the latter to one part of barium stearate.

The metal soap-grease mixture may be applied to the carbon surface to be treated in any convenient manner, as by brushing. The quantity of mixture to be applied in a given case varies depending on the concentrations of barium stearate, the viscosity of the barium stearate-grease mixture, the porosity of the carbon, and the subsequent treatment of the coated carbon, but in general, good protection is attained if about 5 to 30 milligrams of mixture per square inch of carbon venting surface is applied. If the mixture is of low viscosity, no further treatment of the carbon to which it is applied may be necessary. If a mixture of high viscosity is used, a short heating period, e. g., two to three minutes at 110° to 120° C. may be employed to obtain a satisfactory coating.

The following table illustrates the effect of treatment with varying proportions of barium stearate and mineral grease on carbon permeability and electrolyte repellency. In these tests samples of carbon electrodes suitable for use in air-depolarized cells of the type described in the Marsal and Fox application referred to above were treated with different mixtures of barium stearate and mineral grease. A proprietary grease known as "Dolium #2" containing about 18% barium stearate in a mineral grease base was used, being diluted as shown. The treated carbons were immersed in an electrolyte solution containing 250 grams of sodium hydroxide per liter of solution, the solution being maintained at 113° F. About 10 to 15 milligrams of the combined barium stearate grease and mineral grease mixture were used per square inch of carbon in each case. No heat treatment was applied.

| Composition of Stearate-Grease Mixture—Parts by Weight | | Per cent Stearate | Permeability loss—Per cent | Electrolyte Repellency | |
|---|---|---|---|---|---|
| Dolium #2 | Added Grease [1] | | | Per cent Immersed Area Wet | Test Period |
| 1 | 0 | 18 | 80 | 0 | 18 days. |
| 1 | 1 | 9 | 78 | 0 | 18 days. |
| 1 | 2 | 6 | 71 | 0 | 18 days. |
| 1 | 4 | 3.6 | 65 | 0 | 18 days. |
| 1 | 6 | 2.6 | 55 | 0 | 18 days. |
| 1 | 8 | 2.0 | 58 | 50 | 18 days. |
| 1 | 10 | 1.65 | 52 | 0 | 18 days. |
| 0 | 1 | 0 | 20 | 100 | 1 to 2 days. |
| 0 | 0 | 0 | 0 | 100 | 1 hour. |

[1] 1 part petrolatum, 1 part cylinder oil (160 Saybolt viscosity at 200° to 220° F.).

Other tests have shown that carbon similarly treated with barium stearate greases and oil but given a short heat treatment (3 minutes at 110° C.) suffer less than 10% reduction in permeability, but begin to lose electrolyte repellency after about one week of immersion in solution maintained at 113° F., although still resistant to wetting after two weeks of immersion at 70° F. Thus, when heat treatment is used, it may be necessary to increase the quantity of metal soap-grease mixture applied.

The efficacy of the treatment of electrodes with a mixture of metal soap and grease is apparent from the above table. Tests of the invention in cells of the type defined in the Marsal and Fox application referred to above clearly demonstrate that the invention provides for efficient venting of gases present in the cell.

We claim:

1. An air-depolarized primary galvanic cell comprising an immobilized aqueous alkaline electrolyte; a zinc electrode; an enclosed free space for the reception of liquid exuded from said electrolyte; and an improved, air-depolarized, gas-permeable carbon electrode having a portion in contact with said electrolyte and in communication with the ambient atmosphere and a portion communicating with said free space, said last-mentioned portion of said electrode providing a path between said free space and said first-mentioned portion of said carbon electrode for venting gas entrapped in said free space to the outside atmosphere, said portion of said carbon electrode which communicates with said free space having a coating thereon of a mixture of alkali-resistant grease and metal soap selected from the group consisting of stearates of barium, aluminum, magnesium, zinc and manganese and combinations thereof with fatty acids, which coating prevents wetting of said portion of said electrode by liquid collected in said space and consequent blocking of said path.

2. An air-depolarized primary galvanic cell comprising an immobilized aqueous alkaline electrolyte; a zinc electrode; an enclosed free space for the reception of liquid exuded from said electrolyte; and an improved, air-depolarized, gas-permeable carbon electrode having a portion in contact with said electrolyte and in communication with the ambient atmosphere and a portion communicating with said free space, said last-mentioned portion of said electrode providing a path between said free space and said first-mentioned portion of said carbon electrode for venting gas entrapped in said free space to the outside atmosphere, said portion of said carbon electrode which communicates with said free space having a coating thereon of a mixture of mineral grease and barium stearate, which coating prevents wetting of said portion of said electrode by liquid collected in said space and consequent blocking of said path.

3. An air-depolarized primary galvanic cell comprising an immobilized aqueous akaline electrolyte; a zinc electrode; an enclosed free space for the reception of liquid exuded from said electrolyte; and an improved, air-depolarized, gas-permeable carbon electrode having a portion in contact with said electrolyte and in communication with the ambient atmosphere and a portion communicating with said free space, said last-mentioned portion of said electrode providing a path between said free space and said first-mentioned portion of said carbon electrode for venting gas entrapped in said free space to the outside atmosphere, said portion of said carbon electrode which communicates with said free space having a coating thereon of a mixture of mineral grease and barium stearate in the proportions of 1 to 60 parts by weight of grease for each part of barium stearate, which coating prevents wetting of said portion of said electrode by liquid collected in said space and consequent blocking of said path.

4. An air-depolarized primary galvanic cell comprising an immobilized aqueous alkaline electrolyte; a zinc electrode; an enclosed free space for the reception of liquid exuded from said electrolyte; and an improved, air-depolarized, gas-permeable, carbon electrode having a portion in contact with said electrolyte and in communication with the ambient atmosphere and a portion communicating with said free space, said last-mentioned portion of said electrode providing a path between said free space and said first-mentioned portion of said carbon electrode for venting gas entrapped in said free space to the outside atmosphere, said portion of said carbon electrode which communicates with said free space having a coating thereon of a mixture of mineral grease and barium stearate in the proportions of 5 to 35 parts by weight of grease for each part of barium stearate, which coating prevents wetting of said portion of said electrode by liquid collected in said space and consequent blocking of said path.

5. An air-depolarized primary galvanic cell comprising an immobilized aqueous alkaline electrolyte; a zinc electrode; an enclosed free space for the reception of liquid exuded from said electrolyte; and an improved, air-depolarized, gas-permeable carbon electrode having a portion in contact with said electrolyte and in communication with the ambient atmosphere and a portion communicating with said free space, said last-mentioned portion of said electrode providing a path between said free space and said first-mentioned portion of said carbon electrode for venting gas entrapped in said free space to the outside atmosphere, said portion of said carbon electrode which communicates with said free space having a coating thereon of a mixture of mineral grease and metal soap selected from the group consisting of stearates of barium, aluminum, magnesium, zinc and manganese and combinations thereof with fatty acids, which coating contains 1 to 60 parts by weight of grease for each part of metal soap and which prevents wetting of said portion of said electrode by liquid collected in said space and consequent blocking of said path.

ERWIN A. SCHUMACHER.
ROSWELL J. BENNETT.

REFERENCES CITED

The following references are of record in the file of this patent:

UNITED STATES PATENTS

| Number | Name | Date |
|---|---|---|
| 356,727 | Perry | Jan. 25, 1887 |
| 1,544,030 | Oppenheim | June 30, 1925 |
| 1,592,222 | Oppenheim | July 13, 1926 |
| 2,017,280 | Heise et al. | Oct. 15, 1935 |
| 2,120,618 | Martus et al. | June 14, 1938 |
| 2,233,593 | Eddy et al. | Mar. 4, 1941 |

FOREIGN PATENTS

| Number | Country | Date |
|---|---|---|
| 11,399 | Australia | Feb. 22, 1934 |